United States Patent
D'Addetta et al.

(10) Patent No.: US 10,430,675 B2
(45) Date of Patent: Oct. 1, 2019

(54) METHOD AND DEVICE FOR PROVIDING A PIECE OF OCCUPANT INFORMATION FOR A SAFETY UNIT FOR A VEHICLE

(71) Applicant: Robert Bosch GmbH, Stuttgart (DE)

(72) Inventors: Gian Antonio D'Addetta, Stuttgart (DE); Heiko Freienstein, Weil Der Stadt (DE); Josef Kolatschek, Weil Der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/770,983

(22) PCT Filed: Sep. 22, 2016

(86) PCT No.: PCT/EP2016/072584
§ 371 (c)(1),
(2) Date: Apr. 25, 2018

(87) PCT Pub. No.: WO2017/076549
PCT Pub. Date: May 11, 2017

(65) Prior Publication Data
US 2018/0322350 A1   Nov. 8, 2018

(30) Foreign Application Priority Data
Nov. 3, 2015   (DE) .................. 10 2015 221 520

(51) Int. Cl.
*H04N 7/18* (2006.01)
*G06K 9/00* (2006.01)
*B60R 21/015* (2006.01)

(52) U.S. Cl.
CPC ..... *G06K 9/00832* (2013.01); *B60R 21/01512* (2014.10); *B60R 21/01538* (2014.10); *G06K 9/00288* (2013.01)

(58) Field of Classification Search
CPC ............ G06K 9/00288; G06K 9/00832; B60R 21/01512; B60R 21/01538
(Continued)

(56) References Cited

U.S. PATENT DOCUMENTS 6,198,996 B1   3/2001   Berstis
2001/0029416 A1   10/2001   Breed et al.
(Continued)

FOREIGN PATENT DOCUMENTS

WO   0208023 A2   1/2002

OTHER PUBLICATIONS

International Search Report dated Dec. 5, 2016 of the corresponding International Application PCT/EP2016/072584 filed Sep. 22, 2016.

*Primary Examiner* — Robert Chevalier
(74) *Attorney, Agent, or Firm* — Norton Rose Fulbright US LLP; Gerard Messina

(57) ABSTRACT

A method for providing a piece of occupant information for a safety unit for a vehicle includes reading in image data representing an occupant of the vehicle via an interface to an image recording unit of the vehicle, reading in plausibility check data representing a person via an interface to a mobile device, a step of determining occupant data characterizing the occupant using the image data and the plausibility check data, and a step of providing the occupant data to an interface to the safety unit for the vehicle.

7 Claims, 5 Drawing Sheets

(58) Field of Classification Search
USPC ...... 348/77, 61, 64, 143; 386/200, 210, 224, 386/230, 248, 278
See application file for complete search history.

(56) References Cited

U.S. PATENT DOCUMENTS

2008/0285886 A1* 11/2008 Allen ................ G06T 17/05
382/284
2012/0170817 A1 7/2012 Yang et al.

* cited by examiner

METHOD AND DEVICE FOR PROVIDING A PIECE OF OCCUPANT INFORMATION FOR A SAFETY UNIT FOR A VEHICLE

CROSS-REFERENCE TO RELATED APPLICATIONS

The present application is the national stage of International Pat. App. No. PCT/EP2016/072584 filed Sep. 22, 2016, and claims priority under 35 U.S.C. § 119 to DE 10 2015 221 520.2, filed in the Federal Republic of Germany on Nov. 3, 2015, the content of each of which are incorporated herein by reference in their entireties.

FIELD OF THE INVENTION

The present invention relates to a device and method for providing occupation information for a vehicle safety unit.

BACKGROUND

Occupant systems of vehicles, such as airbags or seat belts, in most instances do not apply any adaptation with respect to individual occupant parameters such as age, weight, or gender.

SUMMARY

Example embodiments of the present invention provide a method for providing a piece of occupant information for a safety unit for a vehicle, a device that uses the method, and a corresponding computer program.

As a result of a suitable plausibility check of image data of an image recording unit of the vehicle, plausible pieces of occupant information with respect to an occupant recorded by the image recording unit of the vehicle can be provided, which can be used by a safety unit or an assistance system of the vehicle to adapt a safety function or an assistance function to the occupant.

According to an example embodiment of the present invention, a method for providing a piece of occupant information for a safety unit for a vehicle includes: reading in image data representing an occupant of the vehicle via an interface to an image recording unit of the vehicle; reading in plausibility check data representing a person via an interface to a mobile device or a data memory; determining occupant data characterizing the occupant using the image data and the plausibility check data; and providing the occupant data to an interface to the safety unit for the vehicle.

The image data representing the occupant can constitute an image depicting the occupant and recorded by the image recording unit. The image recording unit can be an image recording unit that, during operation of the image recording unit, is fixedly installed in the vehicle. For example, the image recording unit can be a camera. The mobile device can represent a smart phone, for example. The mobile device can be carried by the person. The plausibility check data can represent data stored in the mobile device or data generated by the mobile device. For example, the mobile device can be designed to generate the plausibility check data, using an image of the person recorded by a camera of the mobile device or an image of the person stored on the mobile device. The occupant data can be determined, for example, following a successful plausibility check of the image data by the plausibility check data, or vice versa, using the image data and/or the plausibility check data. The plausibility check will be successful when the person coincides with the occupant. For example, the occupant data can be a piece of information about an age, a weight, or a gender of the occupant. The data memory can be part of a system including a data memory, which can be present in the vehicle. For example, a car multimedia head unit shall be mentioned in this regard.

In the step of reading in the plausibility check data, further plausibility check data representing a further person can be read in via the interface to the mobile device or the data memory. In the step of determining, the occupant data can furthermore be determined using the further plausibility check data. In this way, plausibility check data of two different persons can be provided by one and the same mobile device for a plausibility check of the image data which are provided by the image recording system of the vehicle. The different persons can be persons who share a use of the mobile device or who according to the present invention are frequently situated jointly in the vicinity of the mobile device. This applies, for example, in the case of a smart phone of a parent accompanying a child.

In an example, the method includes a step of requesting further plausibility check data representing a further person if it is not possible in the step of determining to determine the occupant data using the image data and the plausibility check data. In this case, the method can include a repeated step of determining the occupant data using the further plausibility check data. The inability to determine the occupant data can result, for example, from the fact that a plausibility check of the image data using the plausibility check data is not successful since the occupant and the person are different persons. In this case, the further plausibility check data can be requested by the person to whom the plausibility check data are assigned. This is advantageous since due to the read-in plausibility check data it can be assumed with certainty that the person whose plausibility check data were read in is situated in the vehicle, and is thus able to provide information about the occupant recorded by the image recording unit of the vehicle.

In an example, the method includes a step of adapting the safety unit using the occupant data. For example, a belt force of a seat belt or an internal pressure of an airbag can be adapted using the occupant data. It is also possible to adapt a display of a display unit relating to a use of the safety unit, for example an icon depicting a child or an adult, using the occupant data.

In an example, the method includes a step of ascertaining the plausibility check data, using an image representing the person. The image can have been stored in the mobile device or instantaneously recorded using an image recording unit of the mobile device. An instantaneous recording of the image has the advantage that it can be assumed with a high likelihood that the image is assigned to the person presently carrying the mobile device.

In the step of ascertaining, the image representing the person can be normalized using a characteristic of the image recording unit in order to ascertain the plausibility check data as normalized image data. This has the advantage that the data received from the mobile device and the image recording unit of the vehicle can be supplied to a shared image processing process.

It is also possible, in the step of ascertaining, to ascertain parameters of the normalized image as the plausibility check data. In this way, it is not necessary to transmit the image or normalized image itself to a device implementing the method.

This method can be implemented, for example, in software or hardware or in a mixed form made up of software and hardware, for example in a device.

The approach described here thus furthermore creates a device which is designed to carry out, activate, or implement the steps of one variant of a method described here in corresponding units. An object underlying the present invention can also be achieved quickly and efficiently by this embodiment variant of the present invention in the form of a device. A device in the present invention can be understood to mean an electrical device that processes sensor signals and outputs control and/or data signals as a function thereof. The device can include an interface designed as hardware and/or software. In the case of a hardware design, the interfaces can, for example, be part of a so-called system ASIC which includes a wide variety of functions of the device. However, it is also possible for the interfaces to be separate integrated circuits or to be at least partially made up of discrete elements. In the case of a software design, the interfaces can be software modules that are present on a microcontroller, for example, in addition to other software modules.

In addition, in an example embodiment, a computer program product or computer program includes program code stored on a machine-readable carrier or storage medium such as a semiconductor memory, a hard disk memory, or an optical memory, and which is used to carry out, implement, and/or activate the steps of the method according to one of the example embodiments described above, in particular if the program product or program is executed on a computer or a device.

Exemplary embodiments of the present invention are described in greater detail in the following description and with respect to the appended drawings in which identical or similar reference numerals are used for similarly acting elements shown in the different figures, and for which a repeated description of these elements is not provided for the different figures.

DETAILED DESCRIPTION

Figure 1:
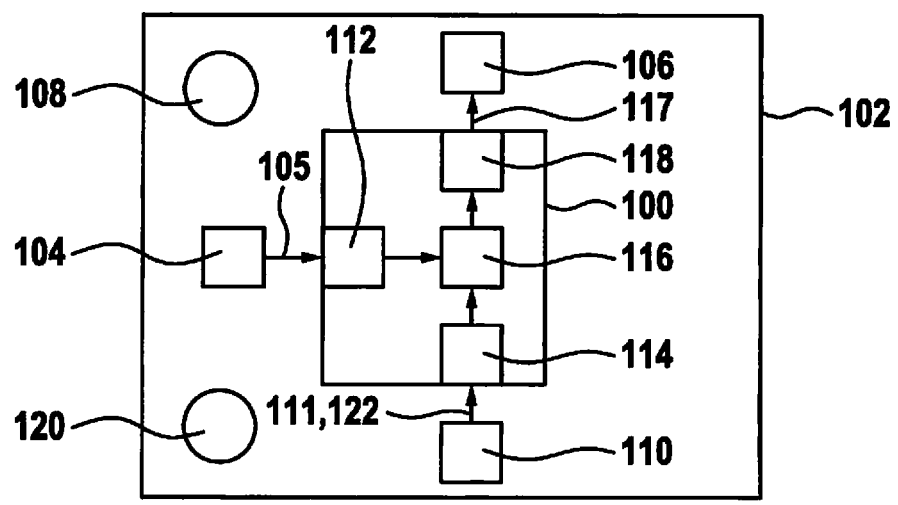
FIG. 1 is a schematic representation of a system including a device for providing a piece of occupant information according to an example embodiment of the present invention.

FIG. 1 shows a schematic representation of a system including a device 100 for providing a piece of occupant information according to one exemplary embodiment. According to this exemplary embodiment, device 100 is integrated into a vehicle 102. Vehicle 102 furthermore includes an image recording unit 104, for example a camera, and a safety unit 106, for example a seat belt or an airbag for protecting an occupant 108 of vehicle 102. Furthermore, a mobile device 110, for example a smart phone of occupant 108, is situated in vehicle 102. Mobile device 110 can enter vehicle 102 together with occupant 108 and can be removed from vehicle 102 again by occupant 108 upon leaving vehicle 102. According to an exemplary embodiment, unit 110 is a data memory of a system present in vehicle 102, such as a multimedia unit.

Image recording unit 104 is designed to record an image of occupant 108 and to provide image data 105 representing the image via an interface to device 100. Device 100 includes a first read-in unit 112 for reading in image data 105.

Mobile device 110 is designed to provide plausibility check data 111 representing occupant 108 via an interface to device 100. Device 100 includes a second read-in unit 114 for reading in plausibility check data 111.

Device 100 furthermore includes a determination unit 116, which is designed to determine occupant data 117 characterizing occupant 108 using image data 105 and plausibility check data 111 read in by read-in units 112, 114. According to an exemplary embodiment, determination unit 116 is designed to determine occupant data 117 from image data 105 and/or plausibility check data 111 when image data 105 can be subjected to a plausibility check by plausibility check data 111. In the shown exemplary embodiment, such a plausibility check is possible since plausibility check data 111 and image data 105 are assigned to the same person, namely occupant 108. Device 100 includes a provision unit 118, which is designed to provide occupant data 117 determined by determination unit 116, which include, for example, a piece of information about a weight, an age, a height, or a gender of occupant 108, to an interface to safety unit 106. Safety unit 106 is designed to adapt a functionality of safety unit 106 to occupant 108, using occupant data 117.

If plausibility check data 111 provided by mobile device 110 are assigned to another person, for example a further occupant 120 of vehicle 102, it is not possible to subject image data 105 read in by camera 104 to a plausibility check by plausibility check data 111. According to an exemplary embodiment, in such a case no occupant data 117 or, for example, standard occupant data are provided to safety unit 106.

According to an exemplary embodiment, mobile device 110 is used by further occupant 120 and thus includes plausibility check data 111 assigned to occupant 120. In such a case, in which image data 105 and plausibility check data 111 are assigned to different persons 108, 120, device 100 is designed to request further plausibility check data 122 from person 120 to whom plausibility check data 111 are assigned, which are suitable for subjecting person 108 to whom image data 105 of image recording unit 104 are assigned to a plausibility check. In this case, second read-in unit 114 can be designed to read in further plausibility check data 122 and provide these to determination unit 116 for determining occupant data 117.

According to an exemplary embodiment, mobile device 110 is designed to provide two or more plausibility check data 111, 122, which are assigned to different persons. For example, mobile device 110 is designed to provide plausibility check data 111 assigned to occupant 108 and further plausibility check data 122 assigned to further occupant 120. Second read-in unit 114 is designed to read in plausibility check data 111, 122 assigned to occupants 108, 120 and to provide these to determination unit 116. Determination unit 116 is designed to determine occupant data 117 assigned to occupant 108 recorded by image recording unit 104 using image data 105 of image recording unit 104 and plausibility check data 111 and further plausibility check data 122. This is possible provided that plausibility check data 111 or further plausibility check data 122 are assigned to occupant 108, and thus may be used to subject image data 105 to a plausibility check.

The described approach enables an additional functionality of a so-called Mob2Car (mobile device 110 to vehicle 102) system in a so-called tandem mode.

According to an exemplary embodiment, a method for logging in more than one person 108, 120 such as a mother and child or an assistant and a person being looked after using a single mobile device 110 is implemented. This approach enables Mob2Car to meet several requirements of the FMVSS 208, as is shown hereinafter based on FIG. 5. According to an exemplary embodiment, the approach represents an important component of the Mob2Car concept.

Mob2Car makes it possible to increase the passive safety by using mobile communication device 110. Mob2Car pursues the goals and work approaches described hereafter.

Occupant protection systems 106, such as airbags and seat belts, in most instances do not apply any adaptation with respect to individual occupant parameters (age, weight, gender). To better protect each individual occupant, the present invention provides for adaptations of limitation parameters. An individual safety adaptation requires robust sensors and/or methods for identifying vehicle occupants 108, 122. The corresponding obvious classification task requires highly developed passenger compartment sensors 104 and causes a high complexity. The new Mob2Car approach utilizes natural data 111 of a user 108 (smart phone 110, app-based) and transmits these to vehicle 102. There, based on an image of user 108 which is additionally transmitted, a plausibility check is carried out during which it is checked, for example, whether person 108 sitting in vehicle 102 matches transmitted data 111.

There are two important design limitations. On the one hand, reliability against failure is required. In any case, at least protection according to the state of the art is to be ensured. On the other hand, data protection is required. The system is configured in such a way that there is no requirement to store personalized user data in vehicle 102, for example in a rental car or a fleet vehicle.

Figure 2:
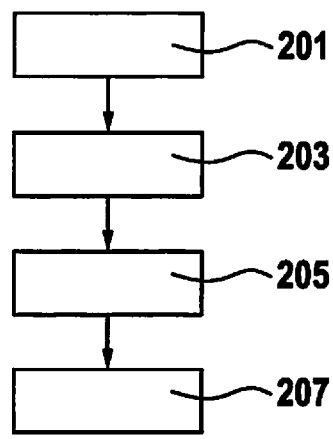
FIG. 2 is a flowchart of a method for providing a piece of occupant information according to an example embodiment of the present invention.

FIG. 2 is a flowchart of a method for providing a piece of occupant information according to an exemplary embodiment. For example, the method can be carried out using the device described based on FIG. 1.

In a step 201 image data of an occupant of the vehicle recorded by an image recording unit of the vehicle, and in a step 203 plausibility check data representing a person, are received via an interface to a mobile device. Steps 201, 203 can be carried out simultaneously or consecutively. For example, steps 201, 203 can be carried out when starting the vehicle or when a person sits down in the vehicle.

In a step 205, the image data and the plausibility check data are used for a reciprocal or mutual plausibility check, for example in that the data are compared to each other. In this way, it can be established whether the person to which the plausibility check data are assigned is the occupant. If this is the case, the occupant data are determined based on the image data and, additionally or alternatively, based on the plausibility check data. In a step 207, the occupant data are provided to an interface to the safety unit of the vehicle.

Figure 3:
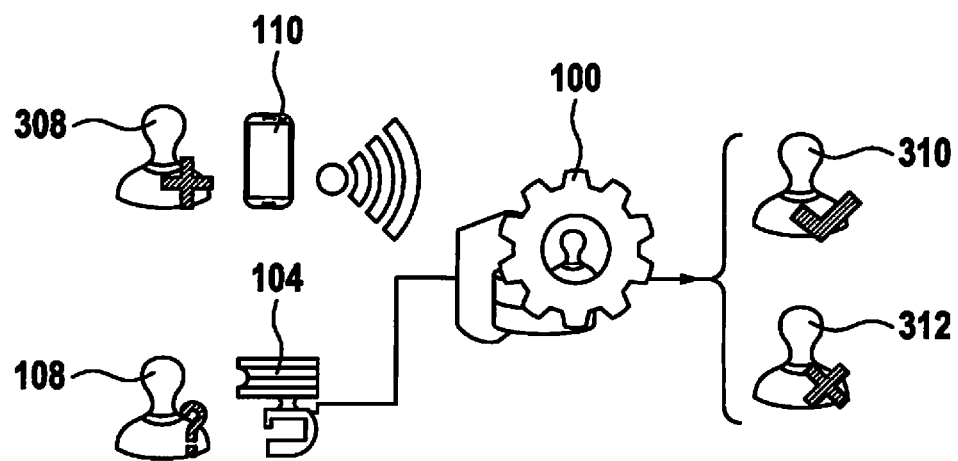
FIG. 3 is a representation of a system including a device according to an example embodiment of the present invention.

FIG. 3 shows a representation of a system including a device 100 according to an exemplary embodiment. The system shows a general configuration of Mob2Car. Device 100 is designed to receive image data of a first person 108, recorded by an image recording unit 104, via a wired interface, and to receive plausibility check data with respect to a second person 308 from a mobile device 110 via a wireless interface. Using the image data and the plausibility check data, device 100 is designed to determine whether persons 108, 308 are the same person, represented by icon 310, or different persons, represented by icon 312.

Figure 4:
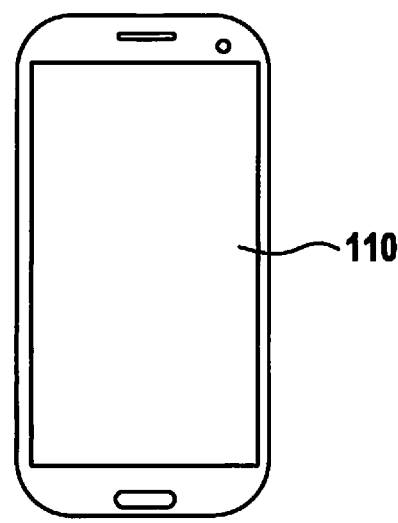
FIG. 4 shows a mobile device for an example embodiment of the present invention.

FIG. 4 shows a mobile device 110 according to an exemplary embodiment. This can be a larger representation of the mobile device shown in FIG. 3, which according to this exemplary embodiment is designed as a smart phone.

Figure 5:
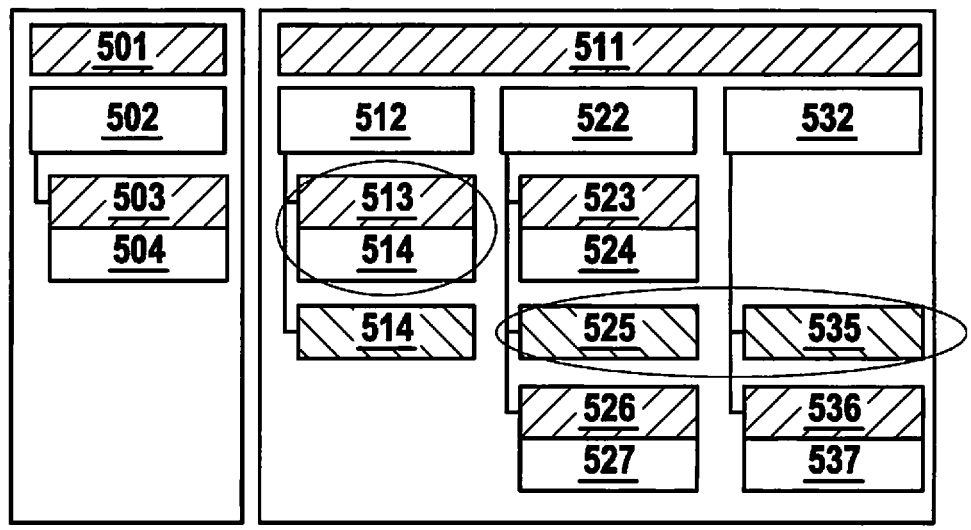
FIG. 5 shows a representation of strategies according to example embodiments of the present invention.

FIG. 5 shows a representation of strategies according to exemplary embodiments.

Block 501 denotes that no FMVSS 208 test requirements exist. Block 502 represents the case that a seat is empty. Block 503 represents a suppression, and block 504 represents a presence.

Block 511 denotes that FMVSS 208 test requirements for minimizing the risk for babies, children, and other occupants against injuries caused by airbags exist. Block 512 represents the case that a baby seat is occupied by a 1-year-old-child dummy. Block 513 represents a suppression, and block 514 represents a presence. Block 515 represents a low risk deployment. Block 522 represents the case of 3- and 6-year-old-child dummies. Block 523 represents a suppression, and block 524 represents a presence. Block 525 represents a low risk deployment. Block 526 represents a suppression, and block 527 represents an "OOP" state. Block 532 represents the case of a 5th percentile adult female dummy in the driver position. Block 535 represents a low risk deployment. Block 536 represents a suppression, and block 537 represents an "OOP" state.

The described approach utilizes a video-based passenger compartment sensing for an occupant classification and an out-of-position detection.

The so-called tandem mode enables a method for logging in more than one person using a single mobile device. For example, this can be a parent and a child, or an assistant and a person being looked after.

This approach enables the Mob2Car to meet certain FMVSS 208 requirements. This is described by way of example based on the "parent/child" application.

A parent with a small child enters both his or her own data (weight, age, gender) and an image or biometric data, as well as the data and optionally an image or biometric data of the child (weight, age, gender, child seat type). This is an initial action. The data remain in the mobile device.

When the parent enters the vehicle, the mobile device transmits both data sets. The plausibility check and the assignment to the seats can be carried out by the system situated in the vehicle, corresponding to a Mob2Car concept, by comparing the biometric data from the mobile device and available data. When the assignment and plausibility check are successful, an adaptable airbag system can be set.

In a first step, this could be an adaptation of the hybrid suppression/deployment of a low risk strategy, as is represented by blocks 513, 514 and 525, 535.

FIG. 5 thus shows different strategies allowed by FMVSS 208. In this way, in reality and taking real accident situations into consideration, systems for occupant protection can be based on different protection options, for example a "static suppression option" for the 1 YOC class and low risk deployment (LRD) for the 3 YOC and 6 YOC classes on the passenger side, and for the 5PFD class on the driver's side. Suitable sensors for occupant classification are required for this case in order to detect the 1 YOC class.

In the case that biometric data for the plausibility check of the child are not available, the parent can be addressed via a human machine interface (HMI) to confirm the data and the seat type (rear-facing child seat etc.) via a keyboard or by pushing a button or a touch screen etc. In addition or as an alternative, further plausibility check methods are possible.

According to an exemplary embodiment, it is advantageous to have further pieces of information, for example a clear icon assigned to the type of the child seat, or the piece of information that the front passenger safety system (passenger side) is now set optimally for a child, but not for protecting an adult, or an indication that the seat and a correct use of the seat belt are mandatory.

Additional plausibility checks and procedures can be integrated into the approach to support the classification of a child.

For example, a plausibility check can be carried out with the aid of reverse logic. When an adult is identified on a front passenger seat, the system is not automatically adapted to a child seat. In this case, an interaction via a human machine interface can be provided.

Alternatively, it can be assumed for the example of a reverse logic that the child hypothesis is more likely for the case that no adult is identified in the head box.

A plausibility check can also take place by a time lapse option. When the entry in the mobile device, which is used to provide the plausibility check data or which represents the plausibility check data, is older than a certain time duration which depends on the seat type (for example, three months for a baby seat, six months for a child seat), the system, in an example, requires an update in the mobile device or a clearing confirmation. For this case, the plausibility check data can include a time stamp, which indicates a creation point in time of the plausibility check data, and a piece of information about the seat type, which is used by the person to which the plausibility check data are assigned. A check of the entry and/or the update or the clearing confirmation can, if required, be requested from the mobile device or, for example, from the device shown in FIG. 1.

Figure 6:
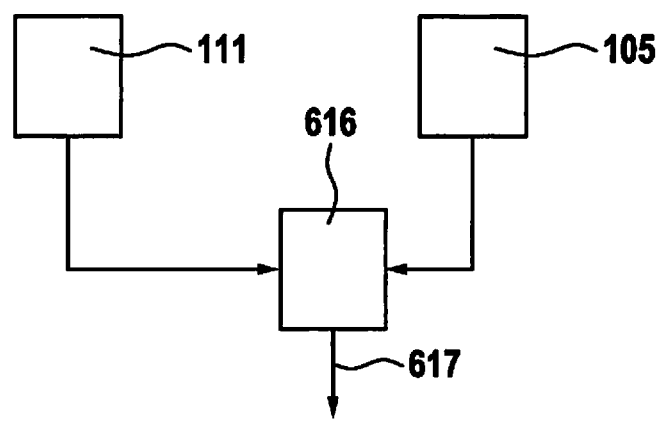
FIG. 6 is a flowchart of a method according to an example embodiment of the present invention.

FIG. 6 is a flowchart of a method according to an exemplary embodiment. According to an exemplary embodiment, the method allows an image and color normalization and, additionally or alternatively, an anonymous transmission of images required for a plausibility check.

A normalization method is used to normalize and anonymize image data transmitted from a mobile device, for example a smart phone.

In the preceding shown Mob2Car concept, the camera images of persons are mainly used for the plausibility check, i.e., compared. These images are recorded with the aid of different camera systems.

The representation in FIG. 6 shows a first image 111 of a first device, also referred to as device or system (A), and a second image 105 of a second device, also referred to as device or system (B). The plausibility check data described based on FIG. 1 can include first image 111. The first device can thus be the mobile device shown in FIG. 1. The image data described based on FIG. 1 can include second image 105. The second device can thus be the image recording unit shown in FIG. 1. Images 105, 111 are transmitted to a block 616 in which a comparison is carried out by an image processing algorithm of the second device. A transmission of first image 111 takes place via an interface. A result 617 of the comparison is output by block 616.

When result 617 indicates that images 105, 111 depict the same person, result 617 can be used by the determination unit shown in FIG. 1 to determine occupant data with respect to this person. According to an exemplary embodiment, block 616 is part of the determination unit described based on FIG. 1.

Depending on different camera and illumination properties, images 105, 111 are generally very different. With respect to second image 105, it should be taken into consideration that the image situation in the vehicle is very special. Special cameras, such as wide angle cameras, are often used as image recording units, as is an illumination in the non-visible range (NIR=near infrared).

A comparative algorithm carrying out the comparison in block 116 should therefore be very tolerant so as not to produce a false negative too often or should be trained for special recording situations. In the first case, however, this means an increased false positive rate (FP rate). In the second case, this means an algorithm which is tailored precisely to the situation. Thus, the use of existing powerful state-of-the-art algorithms is dispensed with. Furthermore, the second case represents a considerable application complexity (recording of image databases and training).

Figure 7:
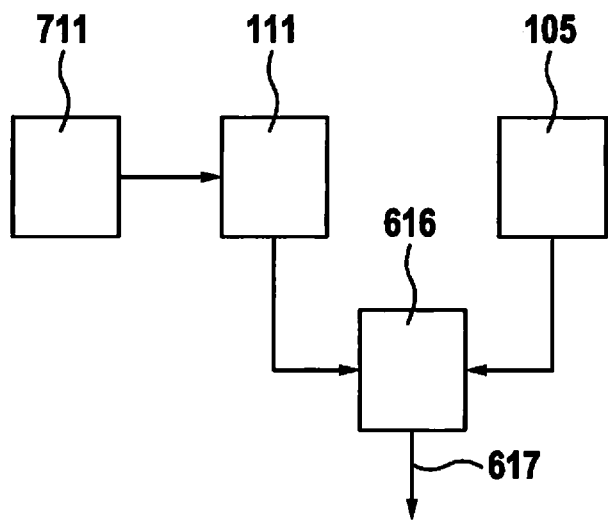
FIG. 7 is a flowchart of a method according to an example embodiment of the present invention.

FIG. 7 is a flowchart of a method according to an exemplary embodiment. A first image 711 of a first device and a second image 105 of a second device are shown. In contrast to FIG. 6, first image 711 is initially subjected to a transformation to obtain a normalized image 111. The normalization refers to the characteristics of the second device. The plausibility check data described based on FIG. 1 can include normalized image 111. The first device can thus be the mobile device shown in FIG. 1. The image data described based on FIG. 1 can include second image 105. The second device can thus be the image recording unit shown in FIG. 1.

Normalized image 111 is transmitted from the first device, and second image 105 is transmitted from the second device, to a block 616 in which a comparison is carried out by an image processing algorithm of the second device. A transmission of first image 111 takes place via an interface. A result 617 of the comparison is output by block 616. When result 617 indicates that images 105, 711 depict the same person, result 617 can be used by the determination unit shown in FIG. 1 to determine occupant data with respect to this person. According to an exemplary embodiment, block 616 is part of the determination unit described based on FIG. 1.

The approach described based on FIG. 7 has the advantage of a low false positive rate and the use of conventional classification algorithms. For this purpose, the images are normalized, in particular first image 711. Image 711 of the mobile device is subjected to a transformation (AB), which knows the characteristics of the camera of mobile device (A) and converts these to the camera of vehicle system (B).

An advantage of this method is that it is possible to utilize an existing powerful state-of-the-art comparison algorithm without complex training, without increasing the false positive rate.

It is discussed hereafter what type of parameters is to be compensated. Trivial differences, e.g., minor differences in the resolution, are tolerated by today's algorithms without problems.

However, spectral corrections and strong distortions are of importance for the performance.

Figure 8:
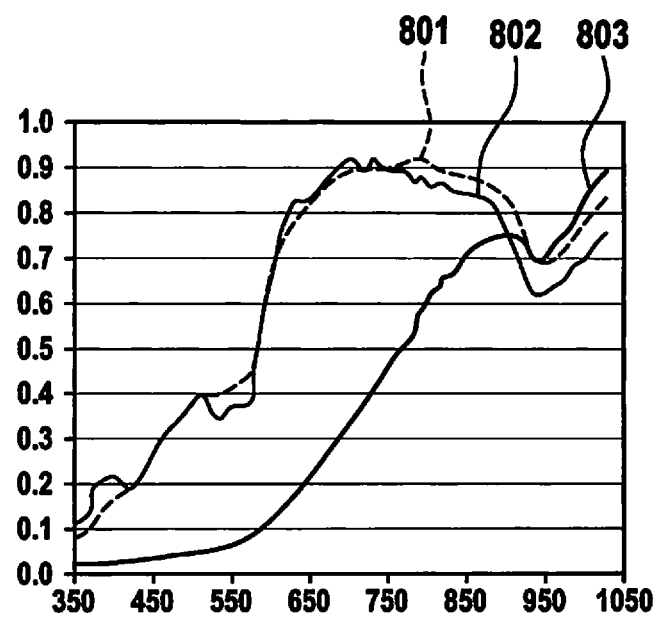
FIG. 8 shows a representation of reflectance properties of human skin types according to an example embodiment of the present invention.

FIG. 8 shows a representation of reflectance properties of human skin types in different spectral ranges according to an exemplary embodiment. A wavelength is plotted in nanometers on the abscissa, and the reflectance is plotted on the ordinate. Shown are a skin type 801 common in Asia, fair skin type 802 common in Northern Europe, and a particularly dark skin type 803. (FIG. 8 source: A Generic Camera Calibration Method for Fish-Eye Lenses, Kannala, Brandt, 2004).

While the skin of a fair skin type 802 in the visible range is represented considerably lighter (~8×) than that of a particularly dark skin type (in the example), it is clearly more similar in the non-visible range (only approximately 2× lighter). This adaptation to an NIR system in the vehicle, for example, is ensured by the transformation (AB), with the aid of which the first image in FIG. 7 is transformed into the normalized image.

The reflectance properties can represent a parameter which can be considered in the transformation described based on FIG. 7 to normalize the first image.

Figure 9:
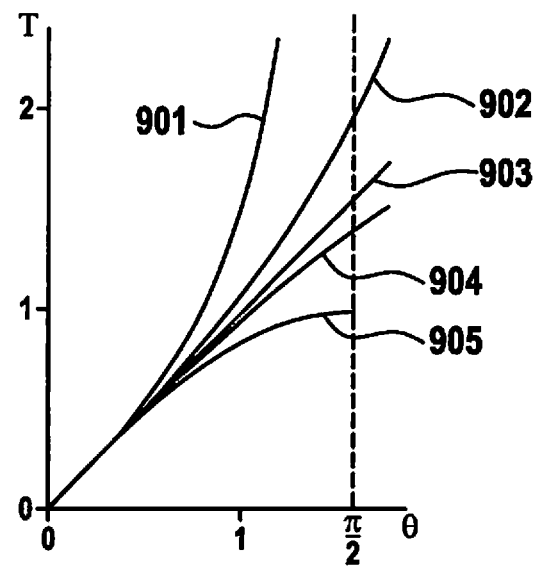
FIG. 9 shows a representation of geometric distortions of different camera models according to an example embodiment of the present invention.

FIG. 9 shows a representation of geometric distortions of different camera models according to an exemplary embodiment. Shown are a perspective projection 901, a stereographic projection 902, an equidistant projection 903, an equisolid angle projection 904, and an orthogonal projection 905. (FIG. 9 source: Human Skin Detection by Visible and Near-Infrared Imaging, Kanzawa et al., 2011).

According to an exemplary embodiment, the geometric distortion of the image is corrected during the transformation described based on FIG. 7. The differences in camera models (the mathematical camera model, e.g., describes the distortions toward the margin of the image) even within the class of the wide angle characteristics may be quite stark.

Hereafter, the equations for curves 901, 902, 903, 904, 905 are provided. Phi, plotted on the abscissa is the angle of incidence, r, plotted on the ordinate, is the distance of the pixel to the principal point, and f is the focal length.

For the perspective projection, 901 applies $r=f \tan(\phi)$.

For the stereographic projection, 902 applies $r=2f \tan(\phi/2)$.

For the equidistant projection, 903 applies $r=f \phi$.

For the equisolid angle projection, 904 applies $r=2f \sin(\phi/2)$.

For the orthogonal projection, 905 applies $r=f \sin(\phi)$.

The most widely used model is the pinhole camera with curve 901. If, for example, imaging system (A), i.e., the device generating the first image with respect to FIG. 7, is of the 901 type, and system (B), i.e., the device generating the second image with respect to FIG. 7, is of the 903 type, which corresponds to a wide angle camera usable in the vehicle, the transformation clearly compresses the first image toward the margins.

The input data for carrying out the transformation are easy to obtain. The camera models of the passenger compartment camera itself are well-known. The characteristics of the images transmitted by the smart phone are typically less distorting than those of the passenger compartment camera. Typical values can be used for this purpose. However, there are also different sources for relevant data for the characteristics of the image from the smart phone in order to improve the quality of the transformation.

In the first case, the first image is directly recorded using the smart phone as the mobile device. A software executed on the smart phone, for example an app, ascertains the geometric camera models of the camera of the smart phone (e.g., from a server database) and transmits these together with the remaining data set, for example as plausibility check data, as described based on FIG. 1. According to different exemplary embodiments, the transformation can then be carried out in the smart phone itself or in the determination unit shown in FIG. 1.

In the second case, the first image is not recorded with the aid of this smart phone. An extraction of image meta data can be carried out. Modern cameras use the option of providing digital images with comprehensive pieces of meta information. Usually basic data of the camera are stored. The standardization of these data is the so-called Exif format (exchangeable image file format). Here, recording parameters, focal length, resolution etc. can be encoded.

In the third case, the first image is a picture of unknown origin without meta file. Here, an assumption of a typical geometry, possibly supported by an estimation from the picture itself, may be applied.

Figure 10:
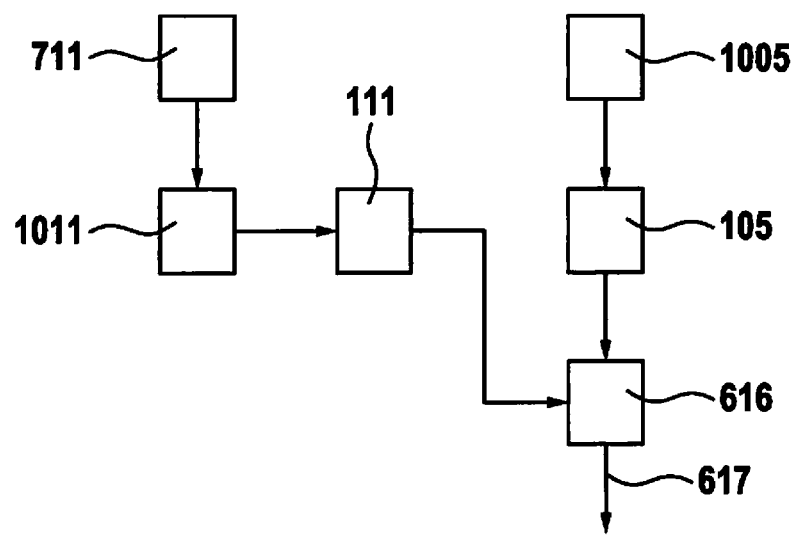
FIG. 10 is a flowchart of a method according to an example embodiment of the present invention.

FIG. 10 is a flowchart of a method according to an exemplary embodiment. A first image 711 of a first device and a second image 1005 of a second device are shown. As described based on FIG. 7, first image 711 is initially subjected to a transformation to obtain a normalized image 1011. The normalization refers to the characteristics of the second device. In contrast to FIG. 7, normalized first image 1011 is subjected to a feature calculation by an image processing algorithm of the first device to obtain first feature parameters 111 of normalized image 1011. The plausibility check data described based on FIG. 1 can include first feature parameters 111. The first device can thus be the mobile device shown in FIG. 1. In contrast to FIG. 7, furthermore second image 1005 is subjected to a feature calculation by an image processing algorithm of the second device to obtain second feature parameters 105 of second image 1005. The image data described based on FIG. 1 can include second feature parameters 105. The second device can thus be the image recording unit shown in FIG. 1. First feature parameters 111 are transmitted from the first device, and second feature parameters 105 are transmitted from the second device, to a block 616 in which a comparison is carried out by an image processing algorithm of the second device. A transmission of first image 111 takes place via an interface. A result 617 of the comparison is output by block 616. When result 617 indicates that images 711, 1005 depict the same person, result 617 can be used by the determination unit shown in FIG. 1 to determine occupant data with respect to this person.

According to an exemplary embodiment, block 616 is part of the determination unit described based on FIG. 1.

The transmission to block 617 can take place encrypted. Nonetheless, an image of the occupant identifiable by humans then exists somewhere in the vehicle. If this is not desired in order to protect privacy, the efficient method described based on FIG. 10 can be used.

If the normalization which results in normalized image 1011 and the feature calculation which results in first feature parameters 111 are combined, only parameters 111, but not images 711, 1011 are transmitted via the interface to block 617. It is not possible to reconstruct the face of the user from parameters 111.

Advantageously, in this way there are no data in the vehicle at any point in time, which allows clear conclusions to be drawn on the occupant. The transmission of parameters 111 instead of images 711, 1011 additionally saves bandwidth.

If an exemplary embodiment includes an "and/or" linkage between a first feature and a second feature, this should be read in such a way that the exemplary embodiment according to a specific embodiment includes both the first feature and the second feature, and according to an additional specific embodiment includes either only the first feature or only the second feature.

What is claimed is:

1. A method for providing a piece of occupant information for a safety unit of a vehicle, the method comprising:
   obtaining, by a processor and via an interface to an image recording unit of the vehicle, image data representing an occupant of the vehicle;
   obtaining, by the processor and via an interface to a mobile device or a data memory, plausibility check data representing a person;
   determining, by the processor and based on the obtained image data and plausibility check data, occupant data characterizing the occupant; and
   at least one of (a) providing, by the processor, the determined occupant data to an interface to the safety unit for the vehicle and (b) adapting, by the processor, the safety unit based on the determined occupant data;
   responsive to initially being unable to determine the occupant data based on the obtained image data and plausibility check data, requesting further plausibility check data representing a further person, wherein the determination of the occupant data is additionally based on the further plausibility check data.

2. The method of claim 1, wherein the safety unit is adapted based on the determined occupant data.

3. The method of claim 1, wherein the obtaining of the plausibility check data includes determining the plausibility check data based on an image representing the person.

4. The method of claim 3, wherein the determining of the plausibility check data includes normalizing the image representing the person based on a characteristic of the image recording unit.

5. The method of claim 4, wherein the plausibility check data includes parameters of the normalized image.

6. A device for providing a piece of occupant information for a safety unit of a vehicle, the method comprising:
   a processor;
   an interface to an image recording unit of the vehicle; and
   an interface to a mobile device or data memory;
   wherein the processor is configured to:
      obtain, via the interface to the image recording unit, image data representing an occupant of the vehicle;
      obtain, via the interface to the mobile device or data memory, plausibility check data representing a person;
      determine, based on the obtained image data and plausibility check data, occupant data characterizing the occupant; and
      at least one of (a) provide the determined occupant data to the safety unit and (b) adapt the safety unit based on the determined occupant data;
      responsive to initially being unable to determine the occupant data based on the obtained image data and plausibility check data, request further plausibility check data representing a further person, wherein the determination of the occupant data is additionally based on the further plausibility check data.

7. A non-transitory computer-readable medium on which are stored instructions that are executable by a processor and that, when executed by the processor, cause the processor to perform a method for providing a piece of occupant information for a safety unit of a vehicle, the method comprising:
   obtaining, via an interface to an image recording unit of the vehicle, image data representing an occupant of the vehicle;
   obtaining, via an interface to a mobile device or a data memory, plausibility check data representing a person;
   determining, based on the obtained image data and plausibility check data, occupant data characterizing the occupant; and
   at least one of (a) providing the determined occupant data to an interface to the safety unit for the vehicle and (b) adapting the safety unit based on the determined occupant data;
   responsive to initially being unable to determine the occupant data based on the obtained image data and plausibility check data, requesting further plausibility check data representing a further person, wherein the determination of the occupant data is additionally based on the further plausibility check data.

* * * * *